US007716138B2

(12) United States Patent
Szeles

(10) Patent No.: US 7,716,138 B2
(45) Date of Patent: May 11, 2010

(54) METHOD FOR DISCOURAGING THE DISTRIBUTION OF ILLEGAL COPIES OF COMPUTER PROGRAMS OVER FILE SHARING NETWORKS

(75) Inventor: Christopher William Szeles, San Jose, CA (US)

(73) Assignee: Macrovision Corporation, Santa Clara, CA (US)

( * ) Notice: Subject to any disclaimer, the term of this patent is extended or adjusted under 35 U.S.C. 154(b) by 740 days.

(21) Appl. No.: 11/652,243

(22) Filed: Jan. 10, 2007

(65) Prior Publication Data

US 2008/0178295 A1 Jul. 24, 2008

(51) Int. Cl.
*G06F 21/00* (2006.01)
(52) U.S. Cl. .............................. 705/56; 705/50; 705/51
(58) Field of Classification Search ................... 705/56, 705/50, 51
See application file for complete search history.

(56) References Cited

U.S. PATENT DOCUMENTS

2005/0091167 A1* 4/2005 Moore et al. ................... 705/57
2006/0048237 A1* 3/2006 Luo et al. ...................... 726/32

* cited by examiner

*Primary Examiner*—Pierre E Elisca
(74) *Attorney, Agent, or Firm*—Victor H. Okumoto; Andy T. Pho

(57) ABSTRACT

Special CD-keys are generated so as to have special patterns recognizable by compliant installer programs, which require special actions to be taken by the compliant installer programs when recognized. Since the special patterns are different than those used for valid CD-keys, non-compliant installer programs will treat them as invalid CD-keys and refuse to install any computer programs for which the invalid CD-keys are provided. The special CD-keys are included in text files that have associated metadata indicating that they are for installing copies of computer programs to be protected. The text files are then offered by agent computers for downloading on file sharing networks.

23 Claims, 2 Drawing Sheets

METHOD FOR DISCOURAGING THE DISTRIBUTION OF ILLEGAL COPIES OF COMPUTER PROGRAMS OVER FILE SHARING NETWORKS

FIELD OF THE INVENTION

The present invention generally relates to file sharing networks and in particular, to a method and system for discouraging the distribution of illegal copies of computer programs over file sharing networks.

BACKGROUND OF THE INVENTION

Unauthorized copying in decentralized networks using peer-to-peer (P2P) file sharing has become a major concern to copyright owners. Unlike a centralized network, decentralization makes it commercially impractical to pursue all copyright violators in court. This is because decentralization requires filing lawsuits against virtually millions of client computer operators instead of only one party operating a central computer.

Accordingly, copyright owners seek other methods for protecting their copyrighted material, such as blocking, diverting or otherwise discouraging the unauthorized distribution of their copyrighted works on a publicly accessible decentralized or P2P file sharing network. In order to preserve the legitimate expectations and rights of users of such a network, however, it is desirable that copyright owners do not alter, delete, or otherwise impair the integrity of any computer file or data lawfully residing on the computer of a file sharer.

Although much of the concern and protection activity has been directed towards music files, other material such as computer programs are also subject to illegal copying and distribution on file sharing networks. Also, although protection activities are primarily directed towards preventing the distribution of material, it would be beneficial if the distribution of illegal copies of material in file sharing networks could also be used somehow to promote the sale of legal copies of the material.

OBJECTS AND SUMMARY OF THE INVENTION

Accordingly, one object of one or more aspects of the present invention is a method for discouraging the distribution of illegal copies of computer programs over file sharing networks.

Another object of one or more aspects of the present invention is a method for discouraging the distribution of illegal copies of computer programs over file sharing networks that may also be used for promoting the sale of legal copies of the computer programs.

Another object of one or more aspects of the present invention is a method for discouraging the distribution of illegal copies of computer programs over file sharing networks that is flexible and provides multiple levels of protection.

These and additional objects are accomplished by the various aspects of the present invention, wherein briefly stated, one aspect is a computer implemented method for discouraging the distribution of illegal copies of a computer program over a file sharingnetwork, comprising: generating a text file including an anti-piracy CD-key for defectively installing illegal copies of the computer program; and offering the text file for downloading on the file sharing network so that participants of the file sharing network may download the text file and use the anti-piracy CD-key included therein to defectively install the illegal copies of the computer program.

Another aspect is a computer implemented method for discouraging the distribution of illegal copies of a computer program over a file sharing network, comprising: receiving a CD-key during an installation process for an illegal copy of a computer program downloaded from the file sharing network; looking for a pattern in the CD-key to indicate that the CD-key is a valid CD-key; installing the illegal copy of the computer program on a designated computer if the CD-key has the pattern; and if the CD-key does not have the pattern, then looking for a second pattern in the CD-key to indicate that the CD-key is a special CD-key requiring special action to be taken.

Another aspect is a system for discouraging the distribution of illegal copies of a computer program over a file sharing network, comprising: an agent computer configured to connect to a file sharing network, and offer a text file for downloading on the file sharing network which includes an anti-piracy CD-key associated with a computer program; and a participant computer of the file sharing network configured with a compliant installer program for installing copies of computer programs, wherein the compliant installer program is configured to receive a CD-key during an installation process for a copy of a computer program, look for a pattern in the CD-key to indicate that the CD-key is a valid CD-key, install the copy of the computer program if the CD-key has the pattern, and if the CD-key does not have the pattern, then look for a second pattern in the CD-key to indicate that the CD-key is the anti-piracy CD-key.

Additional objects, features and advantages of the various aspects of the present invention will become apparent from the following description of its preferred embodiment, which description should be taken in conjunction with the accompanying drawings.

DETAILED DESCRIPTION OF THE PREFERRED EMBODIMENT

Figure 1:
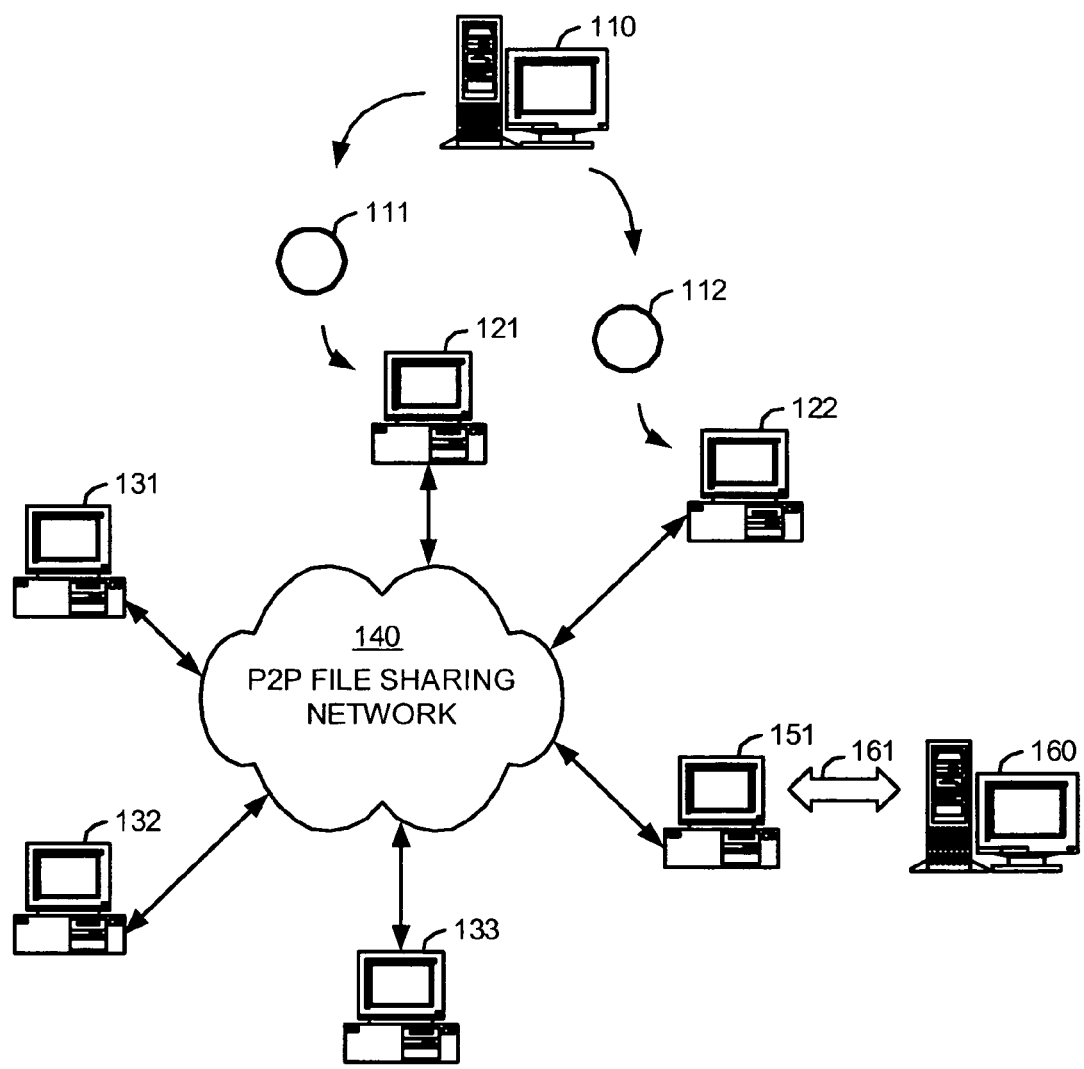
FIG. 1 illustrates a block diagram of a file sharing network with specially configured computers, utilizing aspects of the present invention.

Unlike audio, video and text files, which are immediately usable after downloading, computer programs must first be installed for execution on receiving computers before they can be used. In order to install the computer programs, however, valid CD-keys are required.

Typically, the CD-key is provided along with a copy of the computer program upon purchase. The CD-key is generally not unique to the copy of the computer program. Instead, it contains a pattern that is difficult to determine by individuals attempting to forge a workable CD-key, yet easily authenticated by an installer program that is installing a copy of the computer program. An example of such an installer program is FLEXnet® InstallShield®, a product of Macrovision Corporation of Santa Clara, Calif.

An algorithm is typically used to generate valid CD-keys, which may have different character strings, but the same pattern. By using a random number generator to provide numbers to such an algorithm, a large number of different, yet each valid, CD-keys may be generated by publishers for distribution with authorized copies of their computer program.

Thus, when a user offers a computer program for downloading on a P2P file sharing network, the user may also offer a CD-key to install the computer program. The CD-key in this case may be offered in a text file with a title and metadata for the P2P file sharing network, which identifies the computer program for which the CD-key text file corresponds. Additionally, stolen CD-keys may also be offered in similar text files on the network. Since there is no unique association between the CD-keys and copies of the computer program, a user may download a copy of the computer program from one source and download a CD-key text file from a different source. This makes the procurement of a valid CD-key very easy.

As with audio, video and text files, conventional techniques such as flooding the network with decoy files may also be used to discourage the downloading of computer programs. However, because of the two-tier nature of computer programs, i.e., the need for a valid CD-key in addition to a copy of the computer program, copyright owners get two chances to prevent successful installation of their computer programs. First, they may flood the network with decoy files of their computer programs to make procuring a copy more difficult. Second, they may flood the network with decoy files purporting to include valid or stolen CD-keys to make procuring usable CD-keys for their computer programs more difficult.

Flooding the network with decoy files, however, provides no additional benefit to copyright owners of computer programs other than to make it more difficult to download and use illegal copies of their computer programs. The two-tier nature of computer programs, however, presents additional opportunities to computer program copyright owners. In particular, the illegal copies being distributed on the P2P file sharing network may be used for some other purpose such as sources for additional revenue or free advertising of their products. Also, the two-tier nature of computer programs may be used to implement different levels of protection.

As previously explained, valid CD-keys for a computer program are generated using an algorithm that generates all of its CD-keys so that they have a same pattern. A different algorithm may be used to generate CD-keys with a different pattern. In the present invention, the computer program's installer is modified so that it checks for not only the pattern corresponding to a valid CD-key, but also for one or more other patterns corresponding to special anti-piracy CD-keys. Each of these special CD-keys in turn, corresponds to a different action to be taken by the installer upon their detection.

Examples of such actions include impairment actions such as freezing the computer during the installation process so that the user needs to shut down the installer and restart the installation process, only to find that the installer freezes up again after entering one of the special CD-keys. Alternatively, the installer may continue the installation process, but install a version that has reduced functionality, or a version that is totally non-functional, or a version that is fully functional, but time limited in either run time or time since installation. If a totally non-functional version of the computer program is installed, a further impairment may be to make its uninstallation difficult.

In addition to impairment actions, other actions may be taken such as revenue generating, promotional, and policing or anti-piracy actions. For example, if a reduced functionality or time limited version of the computer program is installed, the version may be a conventional trial version that gives the user an opportunity to experience the computer program and later upgrade to a fully functional version upon payment of a fee. On the other hand, a non-functional copy of the computer program may be installed that presents an advertising message on the computer display screen when the user attempts to run the computer program. In addition to or in lieu of any of the aforedescribed actions, the installer may also notify an anti-piracy or other Digital Rights Management (DRM) service of the IP address or other identification of the computer that has attempted to install a copy of the computer program using a special anti-piracy key.

Figure 2:
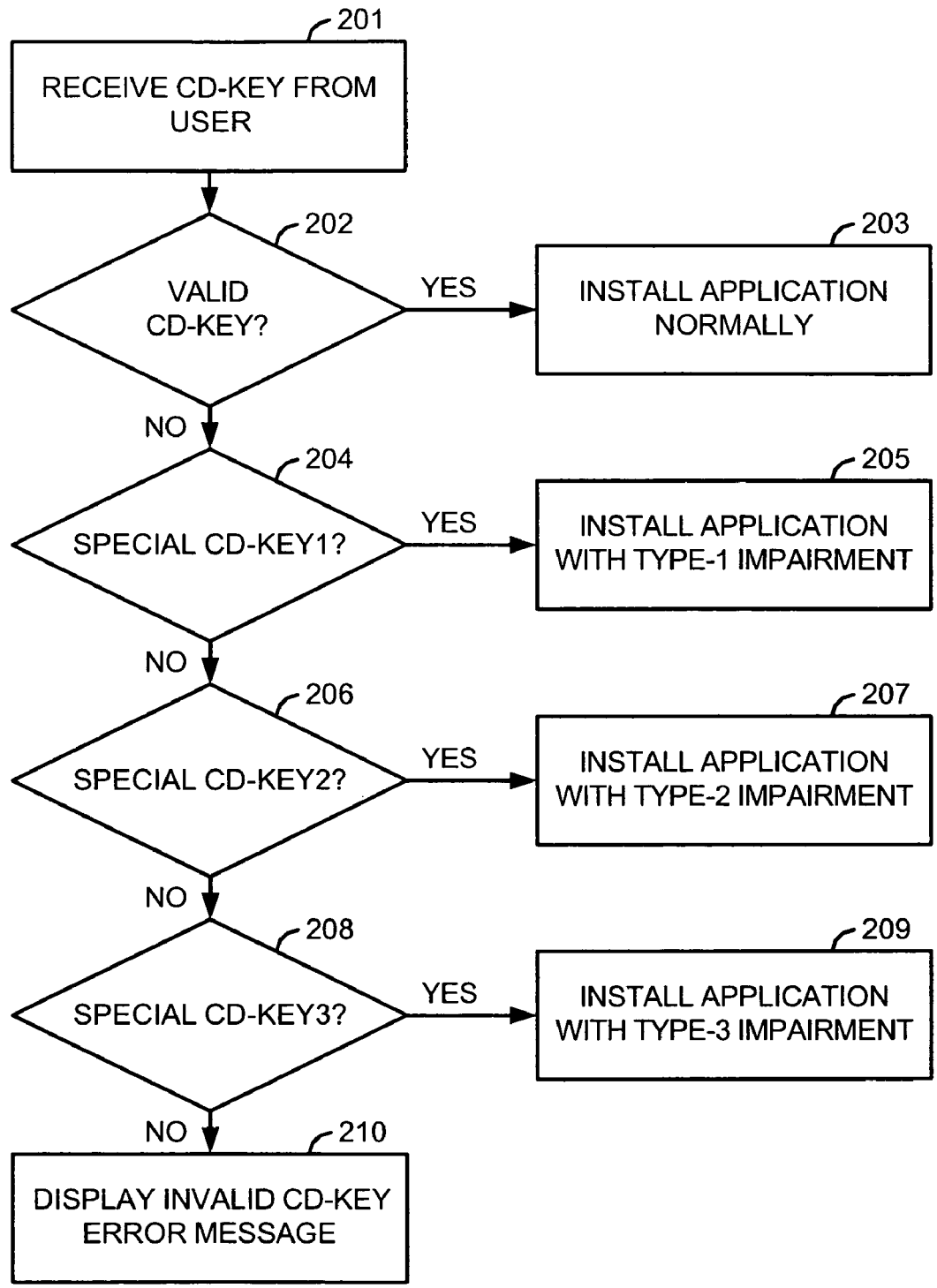
FIG. 2 illustrates a flow diagram of a method for discouraging the distribution of illegal copies of computer programs over file sharing networks, utilizing aspects of the present invention.

Aspects of the invention are now further described in reference to FIGS. 1 and 2.

FIG. 1 illustrates, as an example, a simplified P2P file sharing network generally shown as 140 with member or participant computers 121, 122, 131, 132, 133, 151 pulled out for illustrative purposes. Computers 121, 122 are referred to as "file sharing computers" since they are providing downloadable files for sharing on the network. Computers 131, 132, 133 are referred to as "downloading computers" since they are downloading files being shared by the computers 121, 122. Computer 151 is referred to as an "agent computer" since it is acting on the behalf of the copyright owner of a computer program as further described below.

Two other computers 110, 160 are also shown in FIG. 1, but are not directly part of the P2P file sharing network. Instead, these computers perform functions related to activities of the file sharing computers 121, 122 and agent computer 151.

Computer 110 is referred to as a "publisher computer" since it is operated in this example by a publisher of a computer program who distributes copies of the computer program for sale. The distribution may be by tangible media such as CD-ROMs 111, 112, or the distribution may be by downloading copies of the computer program over the Internet. Customers purchasing such legal copies of the computer program are also commonly provided a valid CD-key for installing the copy of the computer program on their computers.

In the example depicted in FIG. 1, users of file sharing computers 121, 122 have purchased copies of the computer program on CD-ROMs 111, 112, and are now offering downloads of illegal copies of the computer program to other members on their P2P file sharing network 140. In addition, so that the other members may install the illegal copies of the computer program on their computers, the users of file sharing computers 121, 122 are also offering text files to the other members, which include copies of the valid CD-keys they received as part of their purchase. Although not shown, other file sharing computers may also offer text files including stolen CD-keys for installing the copies of the computer program on user computers.

In addition to its conventional role of generating copies of the computer program for sale and valid CD-keys to be distributed along with the copies for their installation, the publisher computer 110 may also modify the computer program and/or its installer to accommodate the method described in reference to FIG. 2. Note that if a third party installation program is used to install the computer program, then the third party vendor would need to modify its installation program to accommodate the method described in reference to FIG. 2.

Supporting the agent computer 151 is another computer 160 which generates text files containing special anti-piracy CD-keys for the computer program, but with titles and/or metadata indicating that they contain valid CD-keys for the computer program. Each of these special CD-keys may be generated by a corresponding special CD-key algorithm that generates a unique pattern so that the computer program installer and/or third party installation program may recognize the pattern and take some pre-programmed action upon its detection.

The agent computer 151 may then offer the text files over the P2P file sharing network just like any other file sharing computer. Although only one agent computer 151 is shown in FIG. 1, in practice, several such agent computers may be used and properly distributed for good coverage of P2P file sharing networks offering illegal copies of the computer program. For additional details on the infiltration of a file sharing network by such agent computers, see, e.g., commonly owned U.S. patent application Ser. No. 10/803,784 entitled "Interdiction of Unauthorized Copying of a Decentralized Network," filed Mar. 18, 2004, which is incorporated herein by this reference.

FIG. 2 illustrates, as an example, a method performed by a computer program installer for installing a copy of the computer program on a user's computer. During the installation process, in 201, the installer receives a CD-key from the user in response to a request for it by the installer. In 202, the installer first checks to see if the received CD-key is a valid CD-key (e.g., one provided by the publisher along with a purchased copy of the computer program). As previously described, it does this by checking whether the received CD-key has the pattern that would be in a CD-key generated by the publisher's CD-key algorithm. If it is, then in 203, the installer installs the full version of the computer program on the user's computer, and ends in a normal manner. On the other hand, if the CD-key received in 201 is not a valid CD-key, then the installer checks to see if it has a pattern generated by one of the special CD-key algorithms provided by an agency service (e.g., the operating entity controlling the computer 160).

For illustrative purposes in the present example, the installer checks for three special CD-key patterns. In 204, the installer determines whether a first special CD-key has been received by checking if it has a pattern matching that generated by a first special CD-key algorithm. If a match is found in 204, then in 205, the installer takes a first programmed action. On the other hand, if a match is not found in 204, then in 206, the installer determines whether a second special CD-key has been received by checking if it has a pattern matching that generated by a second special CD-key algorithm. If a match is found in 206, then in 207, the installer takes a second programmed action. However, if a match is not found in 206, then in 208, the installer determines whether a third special CD-key has been received by checking if it has a pattern matching that generated by a third special CD-key algorithm. If a match is found in 208, then in 209, the installer takes a third programmed action. Finally, if a match is not found in 208, then in 210, the installer proceeds as it normally would to display an invalid CD-key message and abort the installation.

As an example, the first, second and third actions may correspond to different levels of protection being offered by the agency service distributing the special CD-keys. As another example, they may be the same action that is distributed using different CD-key patterns to make their detection as anti-piracy CD-keys more difficult.

Although the various aspects of the present invention have been described with respect to a preferred embodiment, it will be understood that the invention is entitled to full protection within the full scope of the appended claims.

What is claimed is:

1. A computer implemented method for discouraging the distribution of illegal copies of a computer program over a file sharing network, comprising:

receiving a CD-key during an installation process for an illegal copy of a computer program downloaded from the file sharing network;
looking for a pattern in the CD-key to indicate that the CD-key is a valid CD-key;
installing the illegal copy of the computer program on a designated computer if the CD-key has the pattern; and
if the CD-key does not have the pattern, then looking for a second pattern in the CD-key to indicate that the CD-key is a special CD-key requiring special action to be taken.

2. The computer implemented method according to claim 1, further comprising:
performing the special action if the CD key has the second pattern.

3. The computer implemented method according to claim 2, wherein the special action is an impairment action.

4. The computer implemented method according to claim 3, wherein the impairment action is to freeze the designated computer.

5. The computer implemented method according to claim 3, wherein the impairment action is to install a version of the illegal copy of the computer program which has reduced functionality.

6. The computer implemented method according to claim 3, wherein the impairment action is to install a version of the illegal copy of the computer program which is fully functional only for a limited period of time.

7. The computer implemented method according to claim 3, wherein the impairment action is to install a version of the illegal copy of the computer program which is non-functional.

8. The computer implemented method according to claim 2, wherein the special action is a product promotion action.

9. The computer implemented method according to claim 8, wherein the product promotion action is to install a trial version of the computer program that is limited in time or functionality, but provides a user of the designated computer to upgrade to a fully functional version upon payment of a fee.

10. The computer implemented method according to claim 8, wherein the product promotion action is to install a non-functional version of the computer program that presents an advertising message on a computer display screen of the designated computer when a user of the designated computer attempts to run the installed non-functional version of the computer program.

11. The computer implemented method according to claim 2, wherein the programmed action is to clandestinely report an identification of the designated computer to an anti-piracy service.

12. The computer implemented method according to claim 1, wherein if the CD-key does not have the pattern or the second pattern, then looking for a third pattern in the CD-key to indicate that the CD-key is a special CD-key of a second type requiring special action of the second type to be taken.

13. A system for discouraging the distribution of illegal copies of a computer program over a file sharing network, comprising:
an agent computer configured to connect to a file sharing network, and offer a text file for downloading on the file sharing network which includes an anti-piracy CD-key associated with a computer program; and
a participant computer of the file sharing network configured with a compliant installer program for installing copies of computer programs, wherein the compliant installer program is configured to receive a CD-key during an installation process for a copy of a computer program, look for a pattern in the CD-key to indicate that the CD-key is a valid CD-key, install the copy of the computer program if the CD-key has the pattern, and if the CD-key does not have the pattern, then look for a second pattern in the CD-key to indicate that the CD-key is the anti-piracy CD-key.

14. The system according to claim 13, wherein the compliant installer program is further configured to perform a special action if the CD-key has the second pattern indicating that it is the anti-piracy CD-key.

15. The system according to claim 14, wherein the special action is an impairment action.

16. The system according to claim 15, wherein the impairment action is to freeze the participant computer.

17. The system according to claim 15, wherein the impairment action is to install a version of the illegal copy of the computer program which has reduced functionality.

18. The system according to claim 15, wherein the impairment action is to install a version of the illegal copy of the computer program which is fully functional only for a limited period of time.

19. The system according to claim 15, wherein the impairment action is to install a version of the illegal copy of the computer program which is non-functional.

20. The system according to claim 14, wherein the special action is a product promotion action.

21. The system according to claim 20, wherein the product promotion action is to install a trial version of the computer program that is limited in time or functionality, but provides a user of the participant computer to upgrade to a fully functional version upon payment of a fee.

22. The system according to claim 20, wherein the product promotion action is to install a non-functional version of the computer program that presents an advertising message on a computer display screen of the participant computer when a user of the participant computer attempts to run the installed non-functional version of the computer program.

23. The system according to claim 14, wherein the special action is to clandestinely report an identification of the participant computer to an anti-piracy service.

* * * * *